US008204719B2

(12) United States Patent
Diao et al.

(10) Patent No.: US 8,204,719 B2
(45) Date of Patent: Jun. 19, 2012

(54) METHODS AND SYSTEMS FOR MODEL-BASED MANAGEMENT USING ABSTRACT MODELS

(75) Inventors: Yixin Diao, White Plains, NY (US); Denise Y. Dyko, Millbrook, NY (US); Frank N. Eskesen, Saugerties, NY (US); Joseph L. Hellerstein, Ossining, NY (US); Alexander Keller, New York, NY (US); Lisa F. Spainhower, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 1902 days.

(21) Appl. No.: 10/648,179

(22) Filed: Aug. 26, 2003

(65) Prior Publication Data
US 2005/0049901 A1    Mar. 3, 2005

(51) Int. Cl.
*G06F 7/60* (2006.01)
(52) U.S. Cl. .................................................. 703/2
(58) Field of Classification Search ........................ 703/2
See application file for complete search history.

(56) References Cited

U.S. PATENT DOCUMENTS

| | | | |
|---|---|---|---|
| 6,086,618 A * | 7/2000 | Al-Hilali et al. | 703/2 |
| 6,216,119 B1 * | 4/2001 | Jannarone | 706/26 |
| 6,959,335 B1 * | 10/2005 | Hayball et al. | 709/227 |

FOREIGN PATENT DOCUMENTS
WO    WO 02/44901 A2    6/2002

OTHER PUBLICATIONS

Bigus et al. AutoTune: A Generic Agent for Automated Performance Tuning, 2000, Practical Application of Intelligent Agents and Multi Agent Technology, pp. 1-20.*

Bigus et al., ABLE: A toolkit for building multiagent autonomic systems, Sep. 2002, IBM Systems Journal 41(3), pp. 350-371.*
J. Aman et al., "Adaptive Algorithms for Managing a Distributed Data Processing Workload," IBM Systems Journal, vol. 36, No. 2, pp. 1-41, 1997.
R.A. Maxion, "Anomaly Detection for Diagnosis," Proceedings of the 20th International Annual Symposium on Fault Tolerance, pp. 20-27, Jun. 1990.
P. Hoogenboom et al., "Computer System Performance Problem Detection Using Time Series Models," Proceedings of the Summer USENIX Technical Conference, pp. 1-18, Jun. 1993.
M. Thottan et al., "Adaptive Thresholding for Proactive Network Problem Detection," IEEE Third International Workshop on Systems Management, pp. 1-16, Apr. 1998.
R. Isermann et al., "Process Fault Diagnosis Based on Process Model Knowledge," Proceedings of 1989 SAME International Computers in Engineering Conference and Exposition, pp. 631-642, Jul. 1989.
P. Horn, "Autonomic Computing: IBM's Perspective on the State of Information Technology," IBM Research, pp. 1-38, Oct. 2001.
Y. Diao et al., "Generic On-Line Discovery of Quantitative Models for Service Level Management", Proceedings of 2003 IEEE Conference on Integrated Network Management, Mar. 2003, pp. 1-16.

* cited by examiner

*Primary Examiner* — Paul Rodriguez
*Assistant Examiner* — Juan Ochoa
(74) *Attorney, Agent, or Firm* — William Stock; Ryan, Mason & Lewis, LLP (57) ABSTRACT

Techniques for constructing and using models in accordance with service level management are disclosed. In one aspect of the invention, a technique for constructing a model (e.g., a system model) representative of a resource for use in managing a service associated with the resource, comprises the following steps/operations. A set of resource metrics is obtained in accordance with a resource abstract model (RAM) associated with the resource. Then, a model representative of the resource is constructed based on at least a portion of the set of resource metrics obtained from the resource abstract model.

21 Claims, 8 Drawing Sheets

| IBM_DatasbaseStatisticalData (from IBM_DB2) |
|---|
| ☞ <<Counter>> PipedSortsRequested : uint32 |
| ☞ <<Counter>> PipedSortsAccepted : uint32 |
| ☞ <<Gauge>> RemConsIn : uint32 |
| ☞ <<Gauge>> RemConsInExec : uint32 |
| ☞ <<Gauge>> LocalCons : uint32 |
| ☞ <<Gauge>> LocalConsInExec : uint32 |
| ☞ <<Gauge>> ConLocalDbases : uint32 |
| ☞ <<Counter>> TotalCons : uint32 |
| ☞ <<Gauge>> ApplsCurCons : uint32 |
| ☞ <<Gauge>> ApplsInDb2 : uint32 |
| ☞ <<Gauge>> AgentsRegistered : uint32 |
| ☞ <<Gauge>> AgentsWaitingOnToken : uint32 |
| ☞ <<Gauge>> CommPrivateMem : uint32 |

METHODS AND SYSTEMS FOR MODEL-BASED MANAGEMENT USING ABSTRACT MODELS

FIELD OF THE INVENTION

The present invention relates generally to the performance of computer systems and, in particular, to a system and method for automated construction of quantitative models based on characteristics of resources and services that are expressed in abstract models.

BACKGROUND OF THE INVENTION

Today's enterprise systems use a collection of elements to provide business functions such as claims processing and customer orders. Examples of these elements are databases, web servers, and application servers. Collectively, these are referred to as resources. Resources typically have "sensors" that provide data values for metrics (e.g., request rate at a web server) and "effectors" that provide a way to modify their behavior (e.g., central processing unit (CPU) priority in an operating system). Service level management attempts to collect the data that provides a way to identify the appropriate settings for effectors so as to achieve desired service levels.

Central to service level management are tasks such as health monitoring to determine if the system is in a safe operating region, early detection of service level violations, and ongoing optimization of configurations to ensure satisfactory performance. All of these tasks require quantitative insights, preferably quantitative models that predict service level metrics such as response time. Compared to using rule-based policies to conduct the above tasks, having quantitative models can provide a more accurate representation of system behaviors and thus improve the quality for service level management.

Unfortunately, constructing such models requires specialized skills that are in short supply. Even worse, rapid changes in provider configurations and the evolution of business demands mean that quantitative models must be updated on an ongoing basis.

A variety of quantitative models are used in practice. For example, DB2 (available from IBM Corporation of Armonk, N.Y.) performance metrics may be related to response times using a model of the form $y=b_1 x_1+b_2 x_2+ \ldots +b_n x_n$. Here, y is response time, the $x_i$ are DB2 resource metrics (e.g., sort time, total buffer pool read time), and the $b_i$ are constants estimated from the data using least-squares regression. Variable y is referred to as the "response variable" and the $x_i$ as the "explanatory variables." Other examples of quantitative models include queueing network models (e.g., Leonard Kleinrock, "Queueing Systems," Volume I, Wiley, 1975), neural network models (e.g., Simon Haykin, "Neural Networks," Macmilian College, 1994), and nearest neighbors approaches (e.g., J Aman et al., "Adaptive Algorithms for Managing a Distributed Data Processing Workload," IBM Systems Journal, 36(2), 1997).

Many researchers have investigated the detection of service degradations. Central to this approach is modeling normal behavior. For example, R. A. Maxion "Anomaly Detection for Diagnosis," Proceedings of the 20th International Annual Symposium on Fault Tolerance, June, 1990, uses ad hoc models to estimate weekly patterns; P. Hoogenboom et al., "Computer System Performance Problem Detection Using Time Series Models," Proceedings of the Summer USENIX Conference, 1993, employs more formal time series methods; and M. Thottan et al., "Adaptive Thresholding for Proactive Network Problem Detection," IEEE Third International Workshop on Systems Management, April, 1998, uses techniques for detecting changes in networks that are leading indicators of service interruptions.

Further, statistical process control (SPC) charts are widely used for quality control in manufacturing to detect shifts in a process as determined by an appropriate metric(s). These techniques have been applied to computing systems to track critical metrics (e.g., J. McConnell et al. "Predictive Analysis: How Many Problems Can We Avoid?," Networld+Interop, Las Vegas, 2002). However, none of these approaches employ on-line model construction.

Still further, R. Isermann et al., "Process Fault Diagnosis Based on Process Model Knowledge," Proceedings of 1989 SAME International Computers in Engineering Conference and Exposition, July, 1989, uses knowledge of the functional relationship between inputs and outputs to detect changes in system operation. However, the R. Isermann et al. work does not address how to identify a small set of explanatory variables.

Several companies market products that aid in constructing performance policies. For the most part, the techniques employed are based on the distribution of individual variables, not relationships to response variables. One exception is correlation analysis, which uses cross correlation to identify the most important explanatory variables. However, this approach does not model the response variable. Thus, many redundant variables may be included. Further, all of the existing work assumes that the set of potential explanatory variables is known a priori rather than discovered on-line.

Thus, a need exists for improved service level management techniques that overcome these and other limitations.

SUMMARY OF THE INVENTION

The present invention provides techniques for constructing and using models in accordance with service level management.

In one aspect of the invention, a technique for constructing a model (e.g., a system model) representative of a resource for use in managing a service associated with the resource, comprises the following steps/operations. A resource abstract model (RAM) is associated with the resource. The resource abstract model may be constructed by at least one individual with expertise associated with the resource. A set of resource metrics is then obtained in accordance with the resource abstract model associated with the resource. Then, a model representative of the resource is constructed based on at least a portion of the set of resource metrics obtained in accordance with the resource abstract model. The constructed model may comprise a quantitative model.

The inventive technique may further comprise the step/operation of obtaining one or more service level metrics for use in constructing the model representative of the resource. The one or more service level metrics may be obtainable from one or more service level agreements.

Further, the inventive technique may further comprise the step/operation of obtaining a topology of one or more resources used to deliver one or more services associated with the one or more service level agreements, including the resource for which the model is being constructed, for use in constructing the model representative of the resource. The resource may be an element of an autonomic computing environment.

Still further, the inventive technique may further comprise the step/operation of checking the accuracy of the constructed model. The accuracy checking step/operation may comprise use of change point detection.

The constructed model may be useable for at least one of: (i) reporting one or more service level metrics; (ii) automating service level compliance; (iii) permitting a service provider to manage one or more service on demand; and (iv) generating one or more notifications related to automated service level enforcement.

Advantageously, the present invention may provide techniques for on-line discovery of quantitative models for service level management. The techniques may provide a way to construct quantitative models without prior knowledge of managed elements.

In another aspect of the invention, a service provider may agree with a customer (e.g., via a service level agreement or some informal agreement or arrangement) to provide resource management services. That is, the service provider may host the customer's web site and associated applications (e.g., e-commerce applications). Then, in accordance with terms of the contract between the service provider and the service customer, the service provider provides management services which may comprise one or more of the methodologies of the invention described herein. By way of example, this may include the steps of: (i) deploying one or more resource abstract models in association with one or more resources, the one or more resource abstract models being useable to obtain one or more sets of resource metrics; (ii) based on at least a portion of the one or more sets of resource metrics obtained in accordance with the one or more resource abstract models, constructing one or more models representative of the one or more resources; and (iii) using the one or more models to manage one or more services associated with the one or more resources.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention provides techniques for discovering quantitative models by exploiting management information models that express logical relationships between components such as, for example, inheritance, aggregation, composition or association. More particularly, the invention constructs resource abstract models (RAMs) that describe each resource type and help to classify management information (e.g., descriptive information, configuration information, metric and statistical information etc.). For example, a RAM may be associated with each instance of IBM Corporation's Database Management System DB2 version 8.1. However, the invention is not limited to any particular database system. The use of RAMs provides a way for the management system to selectively query the metrics available and their properties, as well as retrieve metric data.

As will be explained in detail below, according to an illustrative embodiment, the invention provides a system that includes the following components:

(i) One or more service level agreements that specify: (a) service level metrics that quantify service delivery service levels; and (b) the manner in which data for the service level metrics are obtained.

(ii) A configuration database that specifies the topology of resources used to deliver the services described in the service level agreement. By topology, it is meant to refer to the minimal set of resources that may be used in service delivery. More detailed topologies specify the resources actually used and the flows between them.

(iii) A plurality of resources (e.g., web servers, elements within the web server), each of which has: (1) a RAM that describes metrics that can be sensed and actions (effectors) that can be taken; (2) a metric data interface through which measurement data can be extracted; and (3) an abstract model interface through which the contents of the model can be accessed.

(iv) An identification and execution engine that interacts with resources (based on their resource abstract models) to collect relevant metrics so as to construct a system model (e.g., that describes quantitative relationships between service level metrics and the metrics available from resources). A system model refers to a specific quantitative model, tailored to a specific type of system, e.g., a database system, a web server or an operating system.

The techniques of the invention provide for automatic construction of a system model and use of the system model to report service level metrics and automate control. In an illustrative embodiment, the overall methodology may include steps to construct RAMs, build the system model, check the system model, report estimates of service level metrics, and control service levels.

Estimating service level metrics from resource metrics is advantageous in that measuring service levels typically requires much more overhead than obtaining resource metrics, e.g., probing is involved. Automating service level enforcement is advantageous in that there can be much more rapid adaptation to changes in workloads and resource configurations. Both capabilities require quantitative models. Moreover, having quantitative models facilitates automatic model extraction from run-time data and provides an accurate representation of system behaviors.

RAMs facilitate model discovery in that they can greatly reduce the data collected for model construction, a consideration that, if not addressed, can significantly limit the extent to which model discovery is practical. To appreciate the concern here, consider the IBM DB2 database management system. In an enterprise system, there may be multiple instances, each collecting approximately 500 metrics available through the performance monitor. Other software components (e.g., application servers, web servers, operating systems, Java Virtual Machines) collect a large number of metrics as well. Thus, it is not uncommon to have tens to hundreds of thousand of metrics to consider when constructing a quantitative model. Using purely data driven techniques requires collecting data for each metric so that its contribution to a quantitative model can be evaluated. Unfortunately, data collection is time consuming and storage intensive.

In accordance with the present invention, RAMs provide a way to reduce the number of metrics considered in advance of data collection. This can be done in several ways.

A first illustrative technique is to use the RAM to expose properties of variables. For example, some variables are counters that are always incremented (e.g., time since last boot, number of bytes received) and others are gauges (e.g., CPU utilization). Typically, models require that the first difference of counters be taken before incorporating them into a quantitative model. By including a property that indicates if a metric is a counter or a gauge, it is known which metrics must be differenced. Otherwise, all metrics must be differenced, which essentially doubles the number of metrics to consider.

A second illustrative technique is to consider the logical groupings of variables that are present in RAMs. For example, in the DB2 performance monitor, variables are organized by component such as buffer pools and table spaces. This structure provides a way to select logically complementary variables rather than including all variables.

Thus, a RAM may be considered a computer readable description of one or more metrics. A simple example of such a description is specifying that response time is composed of CPU (central processing unit) execution times and delays for CPU, I/O (input/output) and memory.

The present invention will be further explained below in the context of an illustrative enterprise system environment. However, it is to be understood that the present invention is not limited to such environment. Rather, the invention is more generally applicable to any environment in which it would be desirable to provide techniques for construction of quantitative models for service level management without prior knowledge of managed elements.

Figure 1:
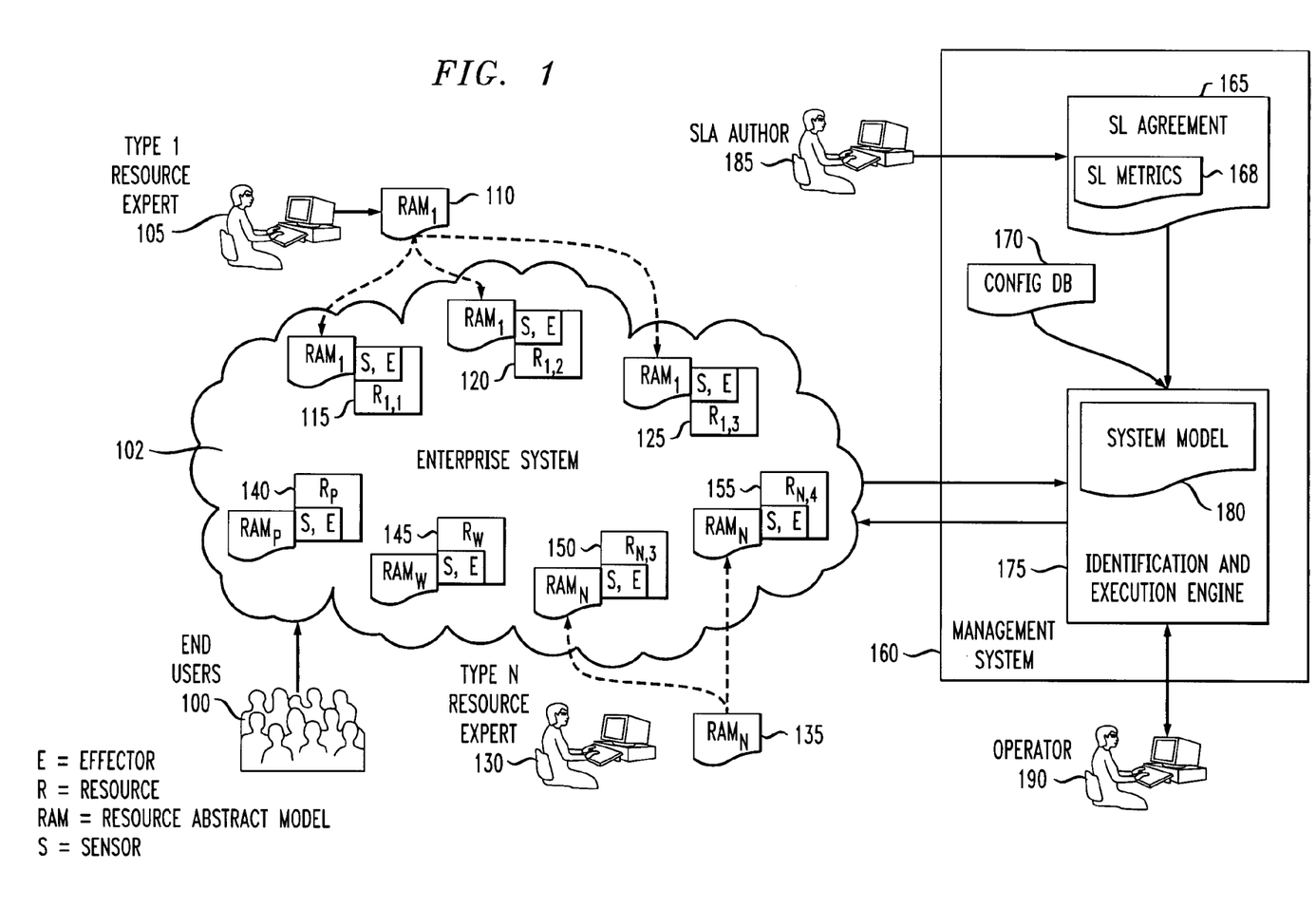
FIG. 1 is a block diagram illustrating a management system and an environment in which the management system may operate, according to an embodiment of the present invention.

Referring initially to FIG. 1, a block diagram illustrates a management system and an environment in which the management system may operate, according to an embodiment of the present invention. As shown, end users 100 interact with an enterprise system 102 to perform business functions such as, for example, but not limited to, claims processing and customer orders. These business functions are achieved through the use of various resources (e.g., 115, 120, 125, 140, 145, 150, 155) that provide services such as, for example, but not limited to, serving web pages and application execution. There may be multiple instances of each type of resource. By way of example only, resources 115, 120 and 125 may all be web servers.

The enterprise system 102 can be regarded as a computing environment referred to as an "autonomic" computing environment. As disclosed in P. Horn, "Autonomic Computing: IBM's Perspective on the State of Information Technology," IBM Research, October 2001, autonomic computing is a comprehensive and holistic approach to self-managed computing systems with a minimum of human interference. The term derives from the autonomic nervous system of the human body, which controls key functions without conscious awareness or involvement. More specifically, one of the goals of autonomic computing is to automate some or all of the tasks an operator 190 would typically carry out.

The resource types are described by a resource abstract model (RAM) 110 that is associated with that resource type or instance. A RAM is constructed by an expert for that resource, such as expert 105 for a type 1 resource and expert 130 for a type N resource 135. Standard software distribution techniques can be used to make a RAM available to a resource instance. Management system 160 has service level agreements 165 that specify end user expectations for interactions with the enterprise system. These expectations are quantified by service level (SL) metrics 168 such as, for example, response time and throughput. Management system 160 also maintains a configuration database 170 in which the system identifies the resources that are used to deliver the services described in the service level agreement. An identification and execution engine 175 within management system 160 interacts with the resources of the enterprise system 102 to: (a) obtain the set of available metrics; and (b) collect data for these metrics. The collected data is used to construct a system model 180 that is used to report service levels.

It is to be noted that some of the resources in enterprise system 102 may be special types that are used for management purposes and not for a business function. For example, response time probes 140 ($R_P$) are resources that simulate end user interactions to collect response time information that is used to assess compliance with service level agreements. Another special resource may be a workload generator 145 ($R_W$) that can create large volumes of synthetic transactions to examine the impact on response times and resource metrics for loads that are not currently being generated by the actual end users.

Figure 2A:
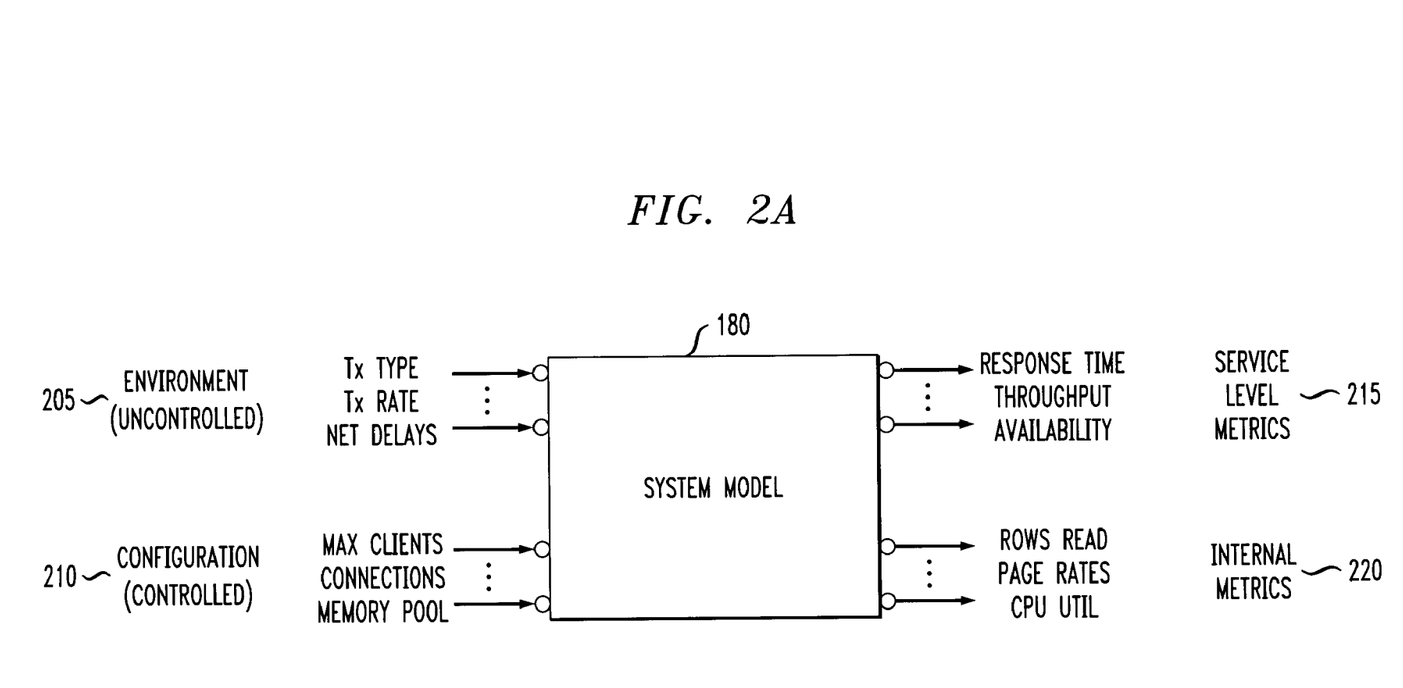
FIG. 2A is a diagram illustrating input-output relationships in a system model, according to an embodiment of the present invention.

Referring now to FIG. 2A, a diagram illustrates input-output relationships in a system model, according to an embodiment of the present invention. The input metrics are referred to as explanatory variables, and the output metrics are referred to as response variables. Specifically, the system model shown relates environmental (uncontrolled) variables 205 (e.g., transactions rates and transaction types) along with controlled variables 210 (e.g., configuration parameters such as the number of concurrent connections in a web server) to service level metrics 215 (e.g., response time) and internal resource metrics 220 (e.g., pages read). It is to be understood that this model may readily be transferred or constructed in different ways.

One variation of the system model relates internal resource metrics to service metrics. Such a model is helpful in estimating the relatively expensive service level metrics from inexpensive (but much less useful) internal resource metrics. Another variation is a system model in which the settings of control variables are calculated based on the desired service level metrics and the current values of the uncontrolled variables and internal metrics.

Figures 2B, 2B:
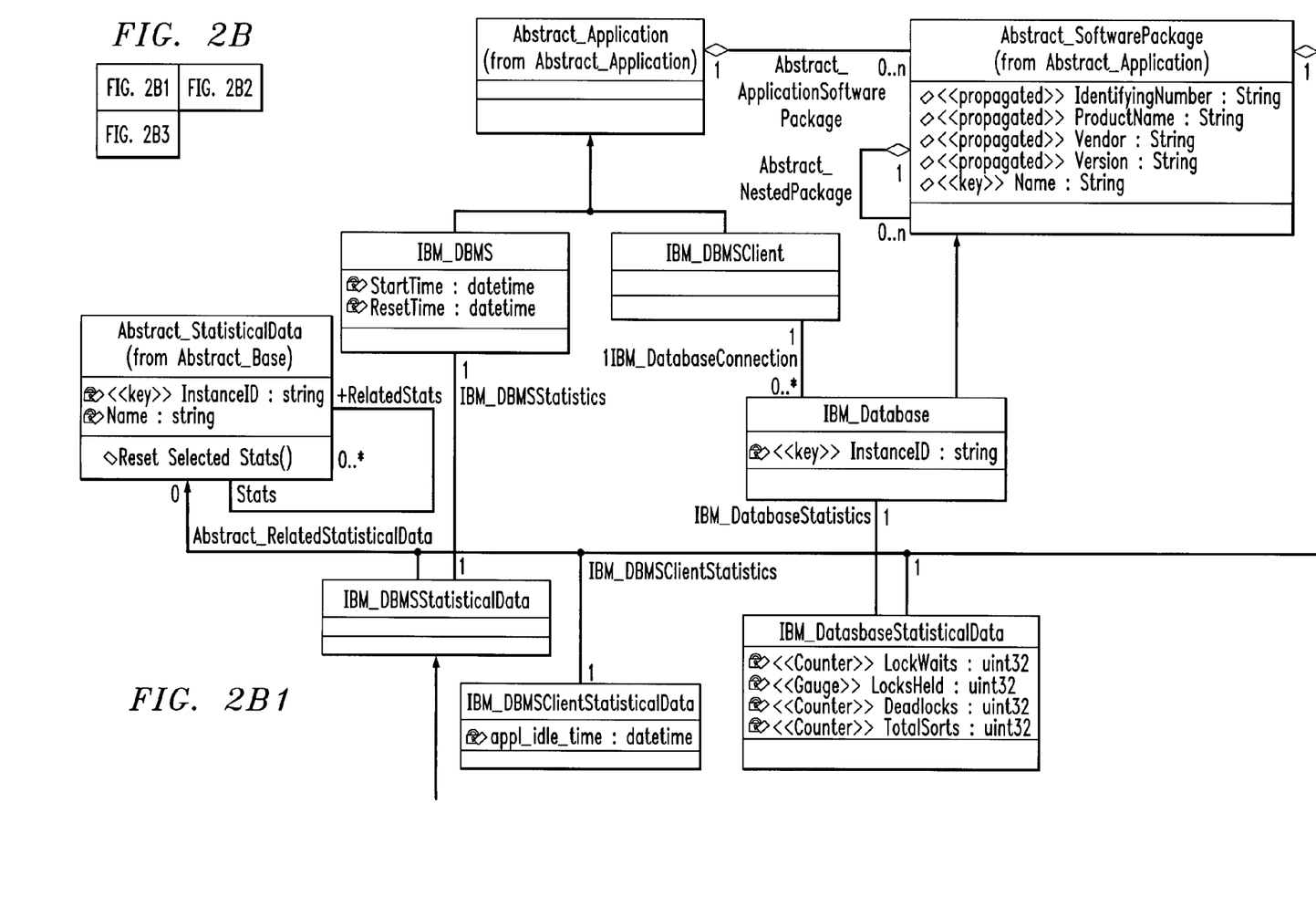
FIG. 2B is a diagram illustrating elements of a resource abstract model for a database management system, according to an embodiment of the present invention.
Figure 2B:
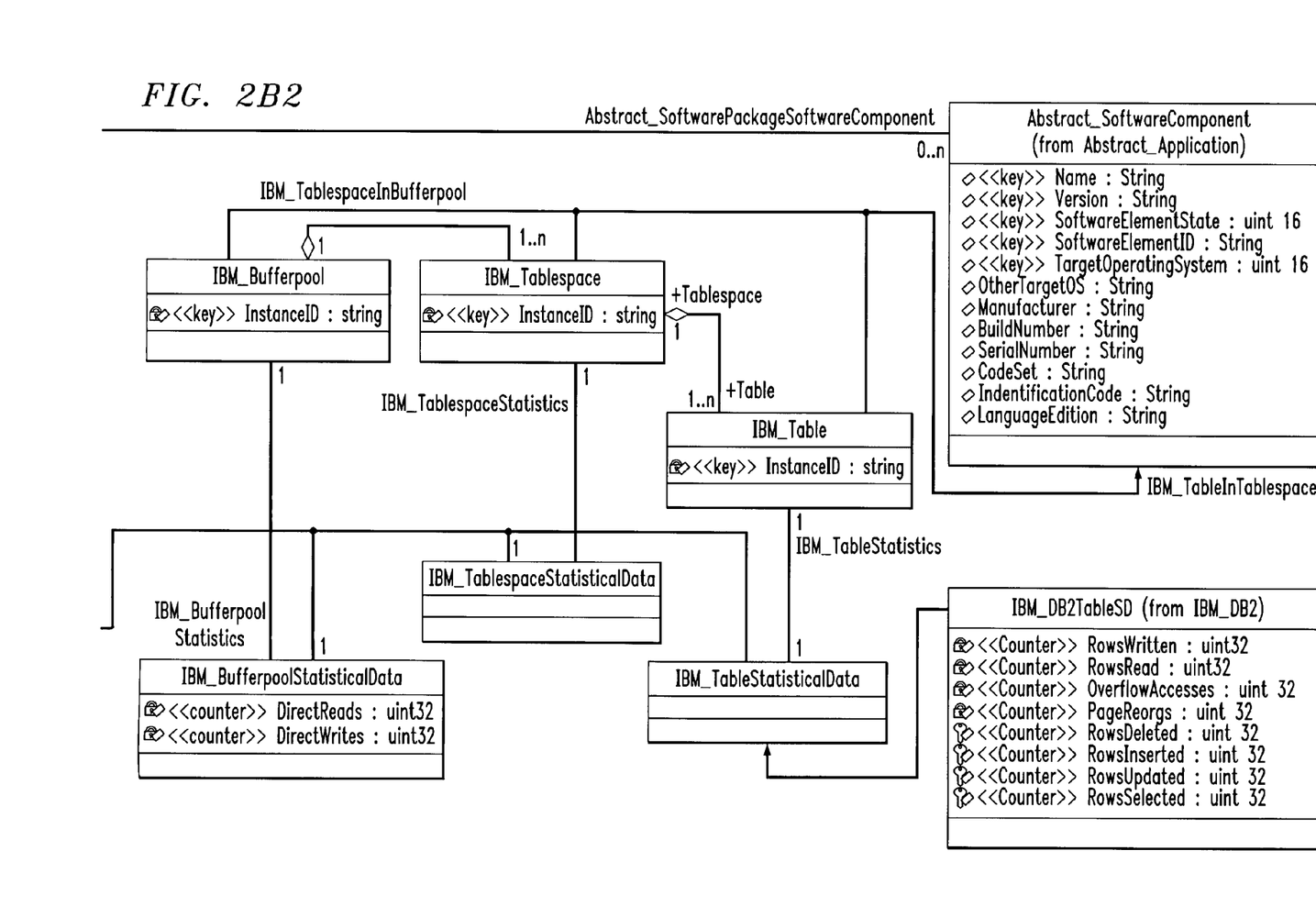
Figure 2B:
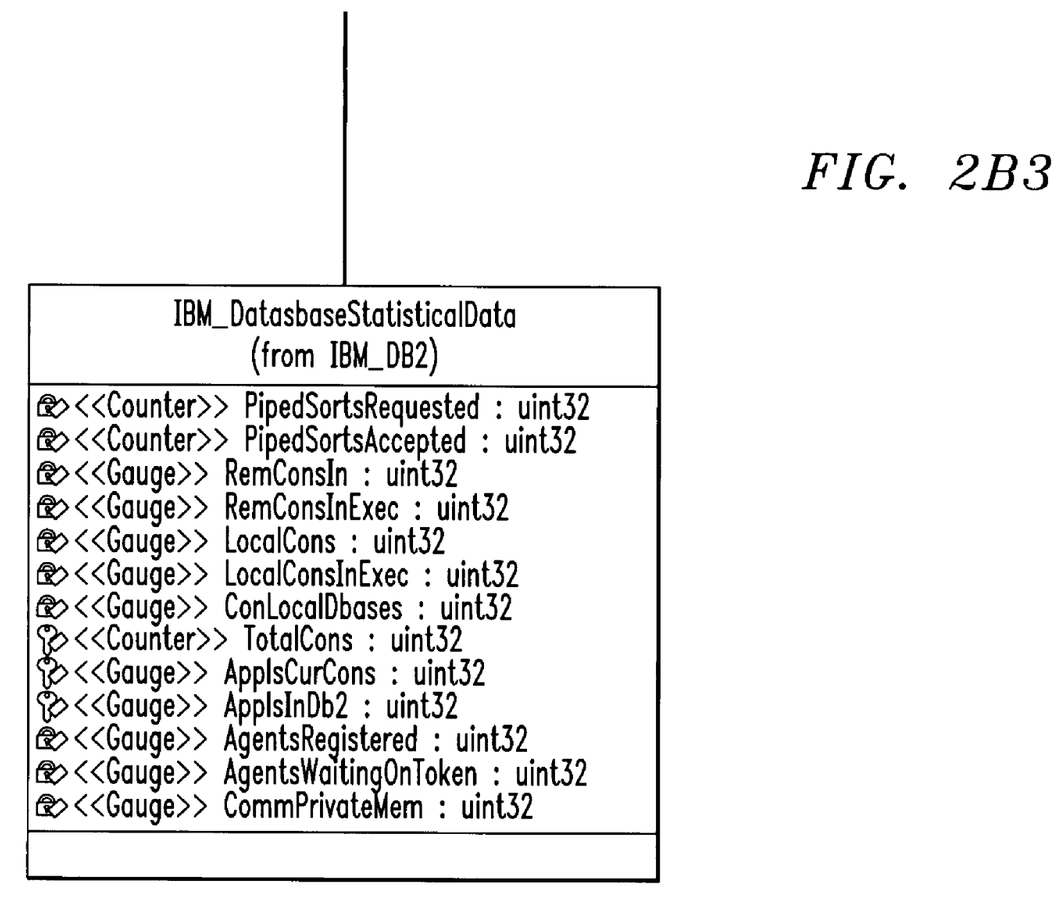

Referring now to FIG. 2B, a diagram illustrates elements of a resource abstract model (RAM) for a resource such as a database management system, according to an embodiment of the present invention. While the invention is not limited thereto, FIG. 2B depicts the main elements of a resource abstract model for the IBM database management system DB2. Such models provide an object oriented representation of logical elements and metrics thereby allowing the management system to discover the metrics available and certain logical relationships that can be used in the construction of system models (which are quantitative models).

Figure 3:
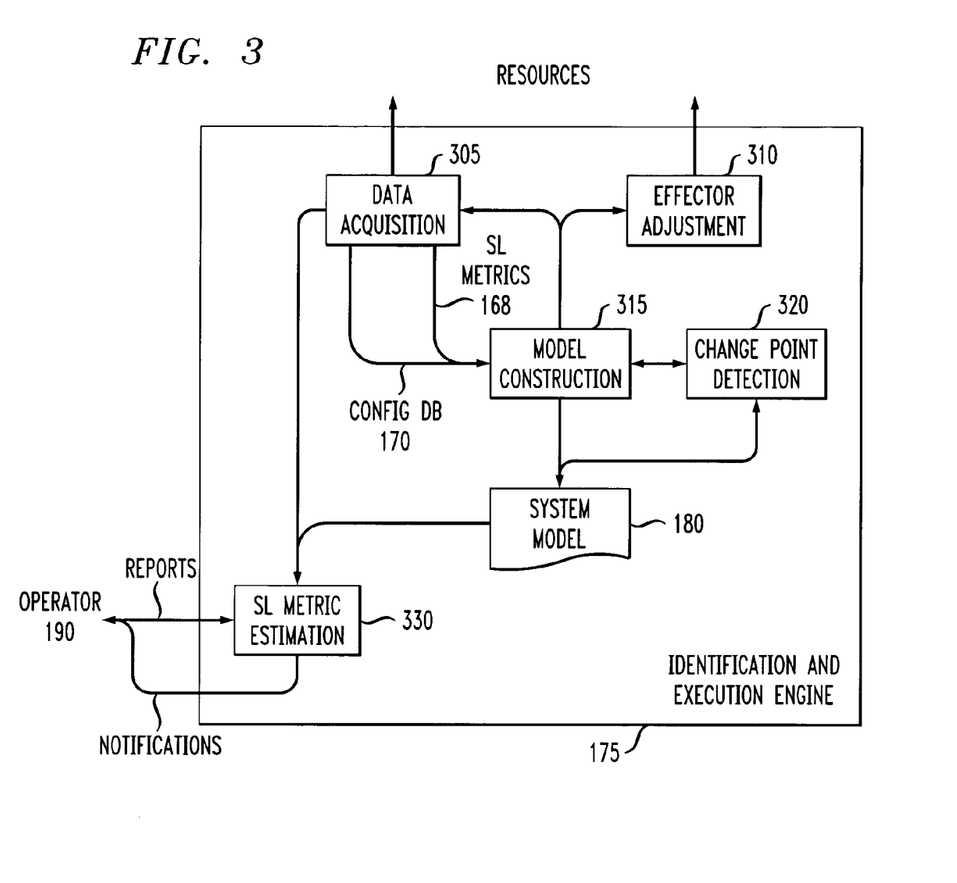
FIG. 3 is a block diagram illustrating components of an identification and execution engine, according to an embodiment of the present invention.

Referring now to FIG. 3, a block diagram illustrates components of an identification and execution engine, according to an embodiment of the present invention. For example, FIG. 3 depicts elements that may comprise identification and execution engine 175 of FIG. 1.

The data acquisition component 305 and effector adjustment component 310 provide the respective interfaces for interacting with resources to obtain their RAMs, metric data, and adjust their effectors (e.g., settings of configuration parameters). These interactions are controlled by the model construction 315 component (based on its knowledge of the service level (SL) metrics 168 in the service level agreement and the service topology as specified in the configuration database 170) to construct various models. The change point detection component 320 determines if a previously constructed system model is still sufficiently accurate for management purposes. The service level metric estimation component 330 uses the system model to estimate values of service level metrics. While not expressly shown, it is to be understood that a control automation component may use the system model to compute new values of effectors to improve the operation of the enterprise system, as is known in the art.

Figure 4:
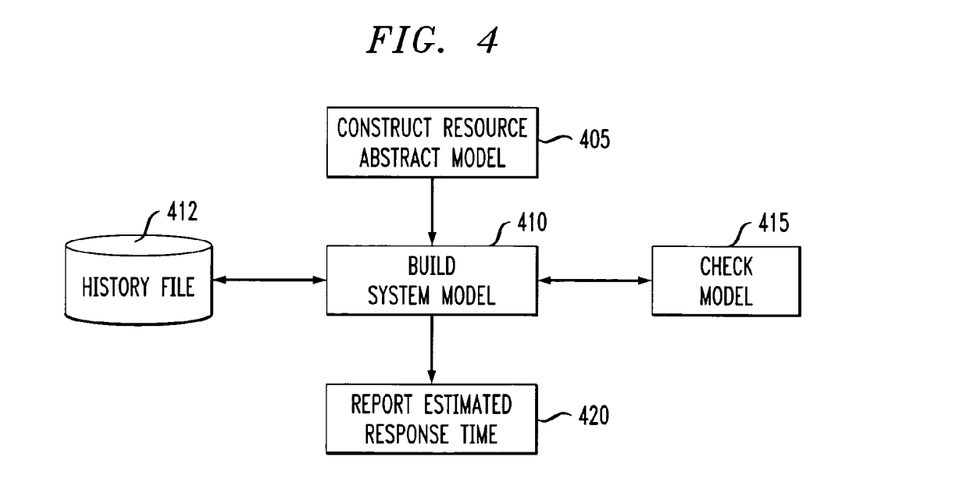
FIG. 4 is a flow diagram illustrating a process for automated construction and exploitation of quantitative models using abstract models, according to an embodiment of the present invention.

Referring now to FIG. 4, a flow diagram generally illustrates an overall process for automated construction and exploitation of quantitative models using abstract models, according to an embodiment of the present invention.

In step 405, one or more RAMs are constructed by resource experts for that type of resource. That is, RAMs are constructed by one or more subject matter experts for the measurement source. For example, a RAM for a web server access log might be constructed by a web server design and/or support team. The model builder uses the RAM to select metrics based on logical relationships. For example, there are many measures of paging (e.g., page-ins, page-outs, faults, page cache hits). The RAM specifies that these are related metrics so that the model builder knows that not all of them may be needed in building the model. Using the RAM reduces the model dimension, which has at least three important consequences: (1) less computation is required to construct the model; (2) less data is collected since fewer parameters are estimated and so the model can adapt more quickly; and (3) since there are fewer parameters, the model tends to be more robust to noise.

In step 410, a system model is built by using a history file 412. The history file is the repository for the metric values. One phase in the system model building process is collecting the data. Such data is stored in the history file. It is to be appreciated that illustrative details of step 410 will be provided below in the context of an explanation of the flow diagram of FIG. 5.

In step 415, the accuracy of the system model is checked. It is to be appreciated that illustrative details of step 415 will be provided below in the context of an explanation of the flow diagram of FIG. 6. In step 420, estimated response times are reported using service level metric estimation (e.g., component 330 in FIG. 3).

Figure 5:
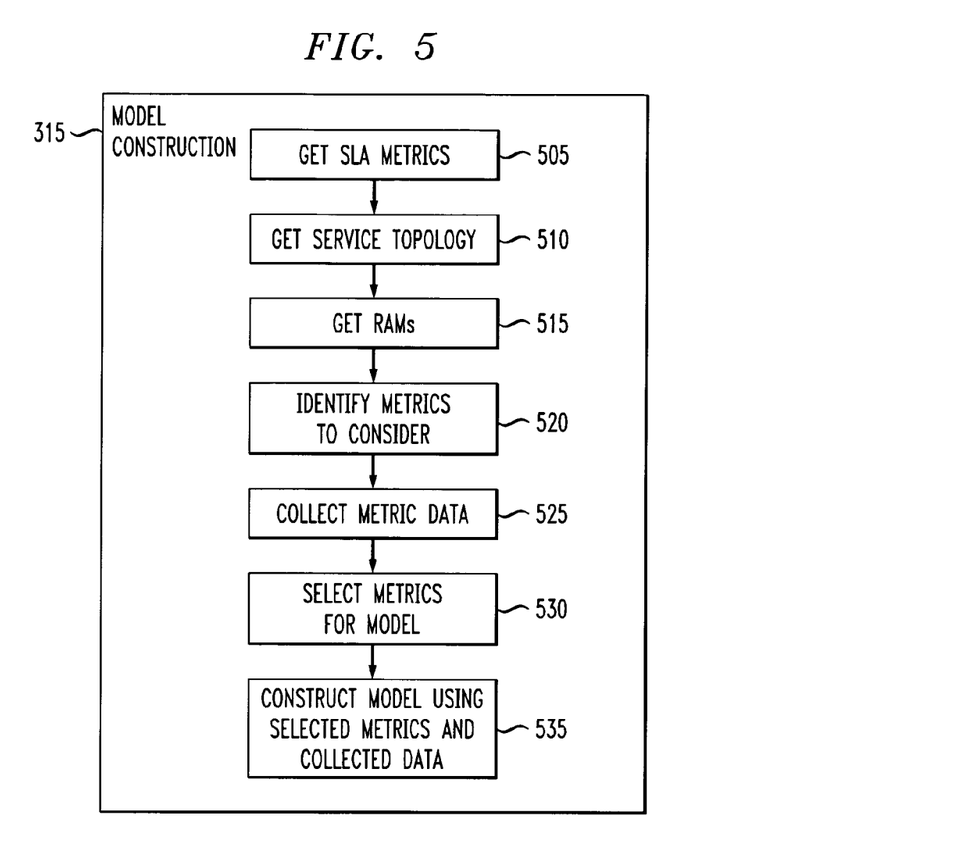
FIG. 5 is a flow diagram illustrating an overall process for building a system model using abstract models, according to an embodiment of the present invention.

Referring now to FIG. 5, a flow diagram illustrates a process for building a system model using abstract models, according to an embodiment of the present invention. This process may be considered an illustrative explanation of step 410 of FIG. 4.

In step 505, metrics are obtained from the service level agreement (SLA). The obtained metrics are stored in history file 412 (FIG. 4). In step 510, the configuration database is queried to get the service topology for the service of interest. In step 515, the RAMs are obtained from the resources identified in the service topology. In step 520, a subset of the metrics available in the identified resources is identified based on considerations such as whether they relate to the features used in the service for the service level of interest. In step 525, metric data is collected from the resources using management-agent interfaces. The collected metric data is stored in history file 412. In step 530, techniques such as principle components analysis and stepwise regression are used to select the metrics to use in the system model. Data is read from history file 412 in step 530. In step 535, the model itself is constructed (e.g., by estimating the constants in a linear regression model).

Figure 6:
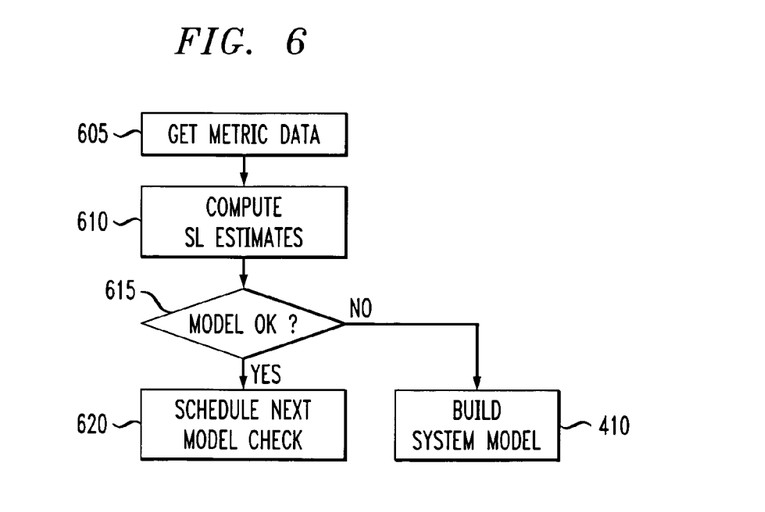
FIG. 6 is a flow diagram illustrating a process for checking the accuracy of a system model, according to an embodiment of the present invention.

Referring now to FIG. 6, a flow diagram illustrates a process for checking the accuracy of a system model, according to an embodiment of the present invention. This process may be considered an illustrative explanation of step 415 of FIG. 4.

In step 605, metric data is obtained. In step 610, the system model is applied to this data to compute service level estimates. In step 615, change point detection (component 320 of FIG. 3) is used to determine if the system model is sufficiently accurate. This can be done by comparing the measured response variable value and the estimated value from the system model. If they differ significantly, then the build system model component 410 (FIG. 4) is invoked. Otherwise, the checking process is rescheduled in step 620.

Figure 7:
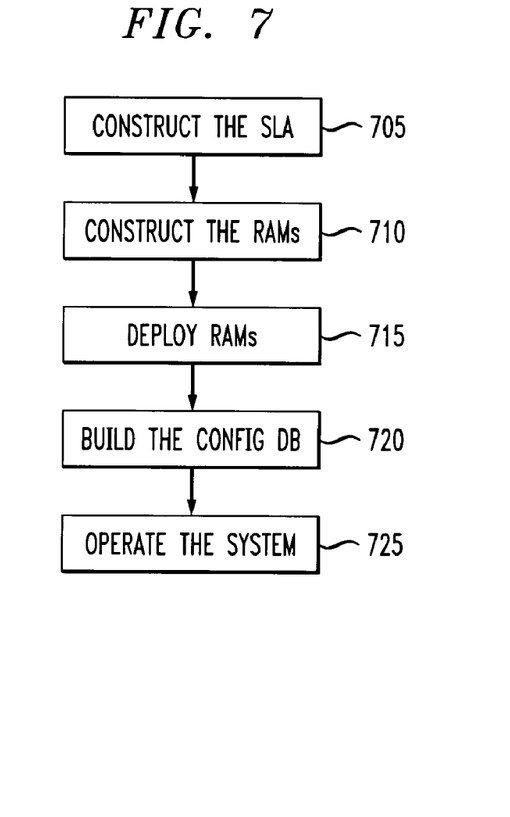
FIG. 7 is a flow diagram illustrating a process for how service providers prepare and distribute information to enable automated operation, according to an embodiment of the present invention.

Referring to FIG. 7, a flow diagram illustrates a process for how service providers prepare and distribute information to enable automated operation, according to an embodiment of the present invention. More specifically, FIG. 7 describes how service providers may prepare the information needed to automate operation using the present invention.

In step 705, the service level agreement is constructed. In step 710, RAMs are constructed for resources that do not already have them. In step 715, RAMs are distributed to their associated resources. In step 720, the configuration database is built so that application topologies can be specified. In step 725, the service level management system operates by observing service level estimates and receiving notifications from control automation.

Now consider an example based on FIG. 1. The business function encompasses a single resource, a server running DB2. The system operates as follows:

1. The management system consults the service level agreement to determine the service level metric. In the example, the service level metric is response time for database transactions.

2. The management system consults the configuration database to determine the service topology for the service level agreement. In the example, this is a single computer running DB2.

3. The management system uses the configuration database to identify a response time probe. The probe is directed to issue requests to the DB2 system every 15 minutes, and the management system collects this data.

4. The management system requests the set of metrics available at the DB2 system. This requires that the DB2 system consult its RAM. When the metrics are returned to the management system, those unrelated to transaction performance (e.g., log file name) are eliminated, and the management system subscribes to the remaining measurements (e.g., approximately 500 metrics, which are delivered every 30 seconds).

5. After sufficient data have been collected, metric selection is done. For the candidate explanatory variables, all counter metrics are differenced (which is possible since metrics are tagged as either counter or gauge), and metrics are eliminated from the system model if their values do not change in the data collected. A stepwise regression is performed using the service level metric(s) (e.g., response time) as the response variable and the remaining metrics as the explanatory variables. An example of a resulting system model for a specific configuration of the IBM DB2 database system is ResponseTime=1.44*MaximumApplications+ 0.000894*BufferReadTime+0.000000969*BufferWriteTime.

6. The management system computes estimated response times every 30 seconds using the above system model.

Figure 8:
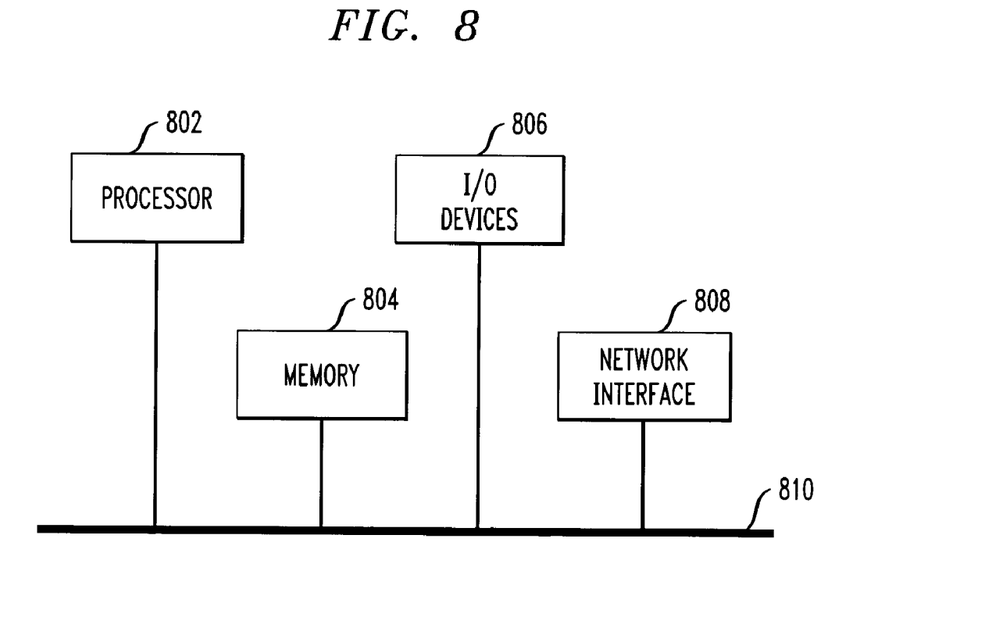
FIG. 8 is a block diagram illustrating an illustrative hardware implementation of a computing system in accordance with which one or more components/methodologies of a management system may be implemented, according to an embodiment of the present invention.

Referring finally to FIG. 8, a block diagram illustrates an illustrative hardware implementation of a computing system in accordance with which one or more components/methodologies of a management system (e.g., components/methodologies described in the context of FIGS. 1 through 7) may be implemented, according to an embodiment of the present invention. For instance, the computing system in FIG. 8 may implement the components associated with management system 160 of FIG. 1 and implement the methodologies described herein. Also, the computing system in FIG. 8 may represent an implementation of one or more of the resources of the enterprise system 102 of FIG. 1. Still further, the computing system of FIG. 8 may represent implementations of computers used by one or more individuals associated with the environment of FIG. 1, e.g., resource experts, SLA authors, operators.

It is to be understood that such individual components/ methodologies may be implemented on one such computer system, or on more than one such computer system. In the case of an implementation in a distributed computing system, the individual computer systems and/or devices may be connected via a suitable network, e.g., the Internet or World Wide Web. However, the system may be realized via private or local networks. The invention is not limited to any particular network.

As shown, the computer system may be implemented in accordance with a processor 802, a memory 804, I/O devices 806, and a network interface 808, coupled via a computer bus 810 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, random access memory, read only memory, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., speaker, display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., read only memory, fixed or removable memory) and, when ready to be utilized, loaded in part or in whole (e.g., into random access memory) and executed by a CPU.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of constructing a model representative of a resource for use in managing a service associated with the resource, comprising the steps of:

associating a resource abstract model with the resource, wherein the resource abstract model is configured to automatically determine a set of resource metrics to be used to construct a model representative of the resource such that a reduced set of resource metrics is considered;

constructing the model representative of the resource based on the reduced set of resource metrics obtained in accordance with the resource abstract model;

obtaining one or more service level metrics for use in constructing the model representative of the resource, wherein the one or more service level metrics are obtainable from one or more service level agreements; and obtaining a topology of one or more resources used to deliver one or more services associated with the one or more service level agreements, including the resource for which the model is being constructed, for use in constructing the model representative of the resource.

2. The method of claim 1, wherein the constructed model comprises a quantitative model.

3. The method of claim 1, wherein the resource abstract model is constructed by at least one individual with expertise associated with the resource.

4. The method of claim 1, wherein the resource is an element of an autonomic computing environment.

5. The method of claim 1, wherein the constructed model is useable for at least one of: (i) reporting one or more service level metrics; (ii) automating service level compliance; (iii) permitting a service provider to manage one or more service on demand; and (iv) generating one or more notifications related to automated service level enforcement.

6. The method of claim 1, further comprising the step of checking the accuracy of the constructed model.

7. The method of claim 6, wherein the accuracy checking step comprises use of change point detection.

8. Apparatus for constructing a model representative of a resource for use in managing a service associated with the resource, comprising:

a memory; and at least one processor coupled to the memory and operative to: (i) automatically determining, via a resource abstract model, a set of resource metrics to be used to construct a model representative of the resource such that a reduced set of resource metrics is considered; (ii) constructing the model representative of the resource based on the reduced set of resource metrics obtained in accordance with the resource abstract model; (iii) obtaining one or more service level metrics for use in constructing the model representative of the resource, wherein the one or more service level metrics are obtainable from one or more service level agreements; and (iv) obtaining a topology of one or more resources used to deliver one or more services associated with the one or more service level agreements, including the resource for which the model is being constructed, for use in constructing the model representative of the resource.

9. The apparatus of claim 8, wherein the constructed model comprises a quantitative model.

10. The apparatus of claim 8, wherein the resource is an element of an autonomic computing environment.

11. The apparatus of claim 8, wherein the constructed model is useable for at least one of: (i) reporting one or more service level metrics; (ii) automating service level compliance; (iii) permitting a service provider to manage one or more service on demand; and (iv) generating one or more notifications related to automated service level enforcement.

12. The apparatus of claim 8, wherein the at least one processor is further operative to check the accuracy of the constructed model.

13. The apparatus of claim 12, wherein the accuracy checking operation comprises use of change point detection.

14. An article of manufacture for constructing a model representative of a resource for use in managing a service associated with the resource, comprising a machine readable non-transitory storage medium containing one or more programs which when executed implement the steps of:
automatically determining, via a resource abstract model, a set of resource metrics to be used to construct a model representative of the resource such that a reduced set of resource metrics is considered;
constructing the model representative of the resource based on the reduced set of resource metrics obtained in accordance with the resource abstract model;
obtaining one or more service level metrics for use in constructing the model representative of the resource, wherein the one or more service level metrics are obtainable from one or more service level agreements; and
obtaining a topology of one or more resources used to deliver one or more services associated with the one or more service level agreements, including the resource for which the model is being constructed, for use in constructing the model representative of the resource.

15. The article of claim 14, wherein the constructed model comprises a quantitative model.

16. The article of claim 14, wherein the constructed model is useable for at least one of: (i) reporting one or more service level metrics; (ii) automating service level compliance; (iii) permitting a service provider to manage one or more service on demand; and (iv) generating one or more notifications related to automated service level enforcement.

17. The article of claim 14, further comprising the step of checking the accuracy of the constructed model.

18. A method of providing resource management services, comprising the steps of:
deploying one or more resource abstract models in association with one or more resources, wherein each of the one or more resource abstract models is configured to automatically determine a set of resource metrics to be used to construct a model representative of the resource such that a reduced set of resource metrics is considered; and
based on the one or more reduced sets of resource metrics obtained in accordance with the one or more resource abstract models, constructing one or more models representative of the one or more resources;
using the one or more constructed models to manage the one or more resources;
obtaining one or more service level metrics for use in constructing the one or more models representative of the one or more resources, wherein the one or more service level metrics are obtainable from one or more service level agreements; and
obtaining a topology of one or more resources used to deliver one or more services associated with the one or more service level agreements, for use in constructing the model representative of the resource.

19. The method of claim 18, wherein the resource is an element of an autonomic computing environment.

20. The method of claim 18, wherein the one or more constructed models are useable for at least one of: (i) reporting one or more service level metrics; (ii) automating service level compliance; (iii) permitting a service provider to manage one or more service on demand; and (iv) generating one or more notifications related to automated service level enforcement.

21. The method of claim 18, further comprising the step of checking the accuracy of the one or more constructed models.

* * * * *